United States Patent [19]

Copley et al.

[11] 4,255,919
[45] Mar. 17, 1981

[54] COTTON HARVESTER WITH AN OFFSET HEAD

[75] Inventors: Russell D. Copley, Ankeny; Francis E. Schlueter, Des Moines; Mark W. Porter, Altoona, all of Iowa

[73] Assignee: Deere & Company, Moline, Ill.

[21] Appl. No.: 54,283

[22] Filed: Jul. 2, 1979

[51] Int. Cl.³ .............................................. A01D 45/18
[52] U.S. Cl. ......................................... 56/30; 56/16.6; 56/98
[58] Field of Search ....................... 56/192, 15.5, 15.2, 56/15.1, 14.9, 30, 98, 16.6

[56] References Cited

U.S. PATENT DOCUMENTS

| | | | |
|---|---|---|---|
| 2,609,650 | 9/1952 | Lindquist | 56/15.2 |
| 2,697,005 | 12/1954 | Hagen et al. | 56/16.6 |
| 2,912,285 | 11/1959 | Hubbard | 56/30 |
| 3,159,956 | 12/1904 | Green et al. | 56/15.1 |
| 3,174,265 | 3/1965 | Capps | 56/30 |
| 3,298,162 | 1/1967 | Medd | 56/15.5 |
| 4,059,942 | 11/1977 | Trimble et al. | 56/30 |

FOREIGN PATENT DOCUMENTS 2536028  3/1976  Fed. Rep. of Germany .............. 56/98

*Primary Examiner*—Paul J. Hirsch

[57] ABSTRACT

A cotton harvester with an offset head having four row units positioned for harvesting cotton planted in uniformly spaced narrow rows. The frame of the harvester is supported near its forward end by a pair of drive wheels adapted to run between two pairs of rows of cotton. The head is offset so that three rows of cotton are accommodated between the wheels and one row of cotton is accommodated outside one of the wheels. The machine drive and guide wheels can therefore be positioned between the rows for ease in steering and driving. A cotton basket on the harvester can be dumped toward the side which is unobstructed by a harvesting unit so the receiving implement can be positioned closer to the harvester and so the head which is offset in the opposite direction can act as a counterweight to balance the harvester as the basket is extended transversely for dumping.

7 Claims, 2 Drawing Figures

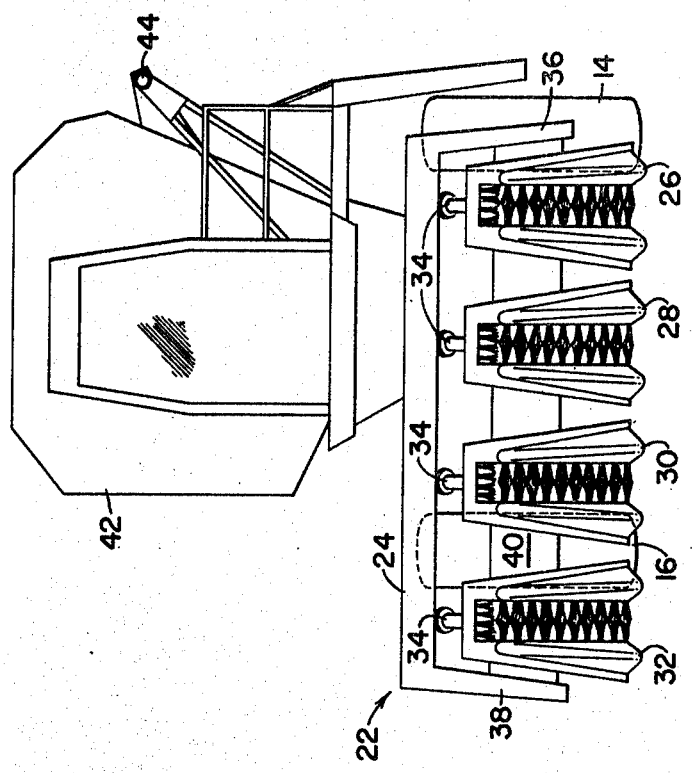
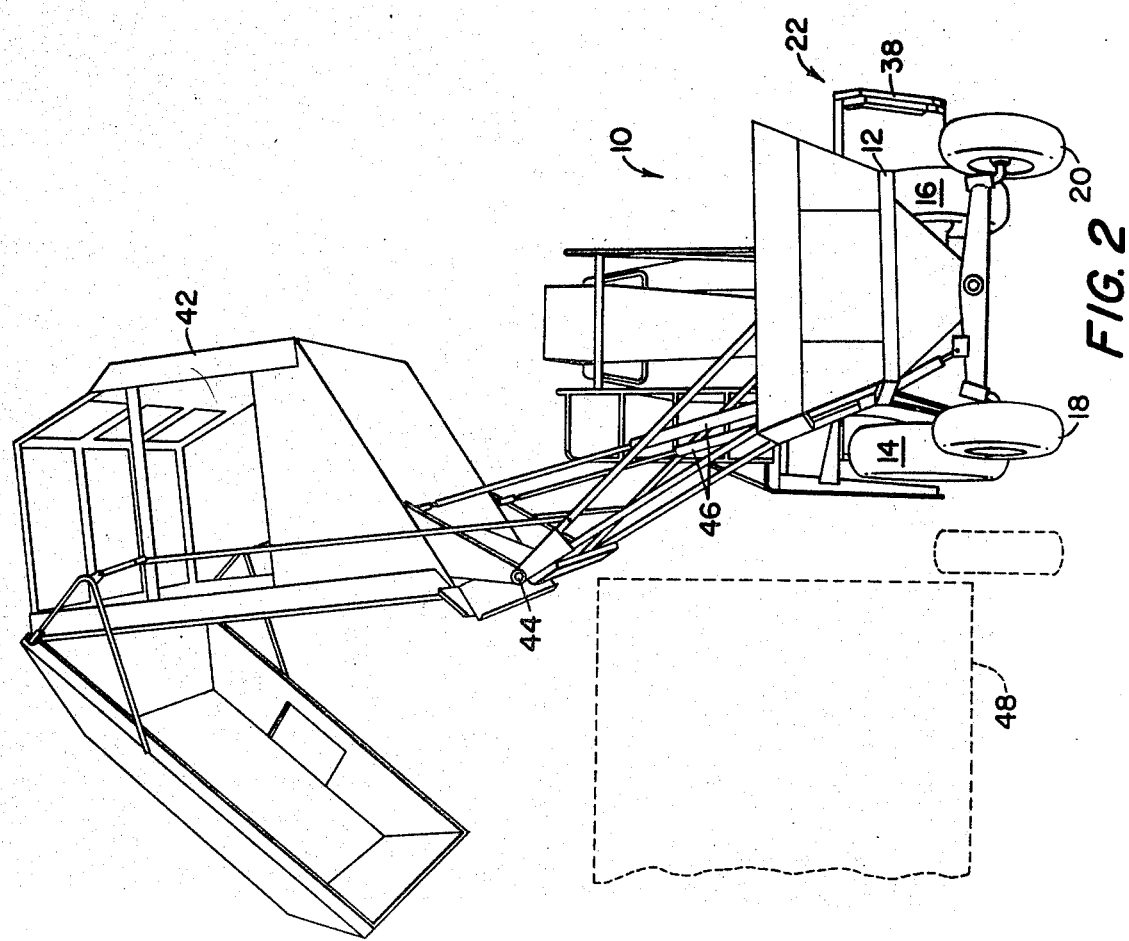

COTTON HARVESTER WITH AN OFFSET HEAD

BACKGROUND OF THE INVENTION

The present invention relates generally to a harvester and more specifically to a cotton harvester with an offset head.

In the past 4-row cotton harvesters have utilized a head with a plurality of harvesting units centered with respect to the centerline of the harvester. The drive wheels of such a harvester are generally spaced between the outer pairs of units so that two rows of cotton, one spaced outwardly from each wheel, and two adjacent rows of cotton located between the wheels are harvested. Such a unit is shown for example in U.S. Pat. No. 4,059,942 and includes a basket or a receiver for dumping into a truck or other cotton carrying implement which can be positioned alongside the harvester. The harvesting unit which is positioned outwardly of the wheel on the side of the harvester from which the basket is dumped presents an obstacle to the receiving implement which prevents it from being positioned closely to the harvester. When narrowly spaced rows are being harvested, the drive wheels are generally aligned with the outboard harvesting units and tend to ride on the harvested rows of cotton making steering and driving the harvester very difficult.

Since the width of the harvester has increased in recent years because the number of front harvesting units have been increased and tend to extend outboard of the wheels, the distance that the cotton basket rocks laterally has to be increased because the receiving implement is spaced further from the frame to avoid contact with the outer harvesting unit. Stability has been a continuing problem as the heavy basket is extended laterally over the implement. This problem is discussed more fully in the aforementioned patent which discloses a stabilizing device for the rear wheel support.

SUMMARY OF THE INVENTION

It is therefore an object of the present invention to provide a harvester which overcomes the abovementioned problems.

It is a further object of the invention to provide a cotton harvester with an offset head for harvesting uniformly spaced narrow row cotton which permits the drive wheels to run between pairs of rows.

It is yet another object of the invention to provide a head for a cotton harvester which permits the receiving implement to be closely spaced to the frame of the harvester without being obstructed by a harvesting unit extending outwardly beyond the drive wheel.

It is a further object of the invention to provide an offset head for a cotton harvester for increasing the stability of the harvester as the cotton basket is extended transversely for dumping into the receiving implement.

It is yet another object of the present invention to provide a cotton harvester for narrow-row cotton which eliminates interference between an outermost harvesting unit and the cotton-receiving implement while providing increased stability for the harvester during dumping and while also permitting the drive wheels to run between rows during harvesting rather than on the rows.

The cotton harvester is provided with a harvesting head offset from the centerline of the harvester in a direction opposite the side from which the cotton is dumped. The head includes three harvesting units for removing cotton from three rows spaced between the drive wheels and an additional unit outboard of the wheel opposite the dumping side for removing cotton from a row outboard of the wheel. The drive wheels therefore can run between the rows rather than on the rows for better steering and driving. The weight of the outboard unit opposite the side of the implement from which the cotton is dumped counterbalances the weight of the basket as it is extended transversely. Since no harvesting unit extends outwardly beyond the wheel on the dumping side on the harvester, the cotton-receiving implement can be moved more closely to the basket.

BRIEF DESCRIPTION OF THE DRAWINGS

FIG. 1 is a front elevation of the cotton harvester imcorporating the offset head of the present invention.

FIG. 2 is a rear view of the harvester shown in FIG. 1 but showing the cotton basket or receptacle in a discharge position above the cotton-receiving implement.

DESCRIPTION OF THE PREFERRED EMBODIMENT

Referring now to FIGS. 1 and 2, a cotton harvester includes a tractor 10 having a main frame 12 carried on a pair of front traction or drive wheels 14 and 16 and on a pair of rear steerable wheels 18 and 20. The main frame 12 carries at its forward end an offset head 22 including a cross auger frame 24 supporting a plurality of forwardly extending harvesting row units 26, 28, 30 and 32 mounted from the left to the right on the frame as viewed by the operator of the harvester. The harvesting units are driven by forwardly extending drive shafts 34 powered in a conventional manner. The cross auger frame 24 carries cross auger drive units 36 and 38 near its opposite ends. As is evident from FIG. 1, the frame 24 remains substantially toward the right of the outside of the drive wheel 14 while the right hand side of the frame 24 extends outwardly beyond the wheel 16.

The harvesting row units 26, 28 and 30 receive three rows of cotton between the wheels 14 and 16. The row unit 32 receives the row of cotton adjacent and outboard of the drive wheel 16. By offsetting the head 22 to the right, the drive wheels 14 and 16, and also the rear steerable wheels 18 and 20, can travel between the rows in narrow row cotton rather than having to ride upon the rows as would be the case if the head 22 was centered with respect to the main frame 12.

As the harvester is moved across the field, the harvesting row units strip the cotton from the plant and a cross auger 40 powered from the cross auger drives 36 and 38 directs the cotton to an air duct. The duct conveys the cotton to a basket or receptacle 42 which is relatively large and carries a considerable amount of weight when full. The basket 42 is connected to the main frame by a pivot 44, and a pair of hydraulic cylinders 46 swing the basket outwardly about the pivot 44 in the direction of the side of the main frame 12 which carries the wheel 14 (FIG. 2) for unloading the basket into a cotton-receiving implement 48. The receiver 48 can be positioned closely to the main frame 12 without interference from a harvesting row unit because the head 22 is offset to the right so that it remains generally inside the outside edge of the wheel 14. As the basket 42 is pivoted about the pivot 44 a considerable amount of weight is shifted to the left of the main frame 12, but this weight is partially offset by the weight of the harvesting row unit 32 which extends outwardly to the right of the frame.

In operation the harvester is driven through the field with the drive wheel 16 positioned between the two right-most parallel cotton rows being harvested with the wheel 14 extending outwardly of the left-most row being harvested so that both wheels are positioned between rather than on rows of cotton. As the harvester moves forwardly through the field the harvesting row units 26, 28 and 30 remove the cotton from the three rows between the wheels 14 and 16 and the unit 32 removes cotton from the row outside the wheel 16. The cross auger 40 conveys the stripped cotton to an air duct or similar type conveyor which moves the cotton to the basket 42. When the basket is ready to be unloaded, the harvester and the receiving implement 48 are moved in close proximity to each other as shown in FIG. 2. The basket 42 is extended over the receiver 48 so that the cotton is dumped therein, and then the basket is moved back to the position shown in FIG. 1. The operation of the basket 42 is described more fully in the aforementioned U.S. Pat. No. 4,059,942.

As is evident from the above, the offset head conveniently spaces the harvesting row units with respect to the drive wheels so the wheels can travel between the rows rather than on the rows while allowing the cotton-receiving implement to be positioned in close proximity the left side of the harvester. In addition, the offset head tends to counterbalance the weight of the basket as it is being dumped.

Having described the preferred embodiment it will be apparent to one skilled in the art that various modifications may be resorted to without departing from the spirit of the invention. Therefore the disclosure should not be taken to limit the invention beyond the broad concepts set forth in the appended claims.

We claim:

1. A cotton harvester for harvesting cotton planted in substantially uniformly spaced parallel rows comprising:
a main frame supported at its forward end by first and second transversely spaced drive wheels; a plurality of transversely spaced harvesting units having crop-receiving openings and carried by the frame generally forward of the wheels, the outermost unit on a first side of the harvester located substantially inside a fore-and-aft plane defined by the outside edge of the first drive wheel and the outermost unit on the opposite side located outboard of the second drive wheel, the units receiving a plurality of rows between the drive wheels and at least one row outside the second drive wheel; and cotton receiving and storage means located on the harvester including means for discharging stored cotton toward the first side of the harvester into a separate cotton-receiving implement wherein the cotton storage means is shifted toward the first side during discharging thereby shifting the center of gravity of the harvester toward that side, and wherein the unit on the outboard side of the second drive wheel tends to maintain the harvester in a balanced condition, and wherein a clear, unobstructed vertical expanse is provided in the fore-and-aft direction along the first side of the harvester for accommodating the cotton-receiving implement in close proximity thereto.

2. The cotton harvester as set forth in claim 1 wherein three harvesting units are positioned between the outboard sides of the wheels and one unit extends outboard of the second wheel.

3. In a cotton harvester for harvesting cotton planted in parallel rows and having a generally fore-and-aft extending main frame supported near its forward end near a first side by a first drive wheel and near the opposite side by a second drive wheel, the harvester carrying a cotton receptacle adapted for receiving harvested cotton and shiftable toward the first side of the frame for discharging the cotton toward the first side, a harvesting head supported near the forward end of the frame comprising: a plurality of transversely spaced harvesting units located forwardly of the first and second drive wheels, each having a crop-receiving opening for accommodating a row therein, including a first unit located generally inboard of the first wheel for receiving a row inside and adjacent the first wheel and including a second unit located outboard of the second wheel for receiving a row outside and adjacent the second wheel, the harvesting units further including a third unit located between the first and second units for receiving a row spaced inside the second wheel so that a clear expanse in the fore-and-aft direction along the first side outside of the first wheel is provided unobstructed by a harvesting unit, and a fourth unit located between the first and third units.

4. In a cotton harvester for harvesting uniformly spaced rows of cotton and including a main frame supported near its forward end by first and second transversely spaced drive wheels, the harvester further including a dumpable basket member pivotable about a fore-and-aft axis that extends outwardly beyond the first drive wheel for receiving cotton and dumping it toward the first drive wheel side of the main frame, an offset harvesting head comprising: a transverse frame mounted forwardly of the main frame; a number of harvesting units supported on the transverse frame and spaced thereon for receiving a like number of rows of cotton between the first and second drive wheels and further including a harvesting unit supported on the traverse frame outboard of the second wheel for receiving a row of cotton adjacent to and outwardly of the second wheel, wherein the head terminates on the first drive wheel side of the main frame substantially inside a fore-and-aft extending vertical plane defined by the outside edge of said wheel so that a clear expanse in the fore-and-aft direction is provided unobstructed outside the frst wheel by the head to facilitate dumping of the basket member.

5. A cotton harvester for harvesting cotton planted in relatively narrowly spaced rows comprising: a main frame including a forward end supported by spaced apart first and second drive wheels adapted to run outside of a first pair of rows and between a second pair of rows respectively, an offset head comprising a transverse frame connected to the forward end forwardly of the drive wheels, a first harvesting unit mounted on the traverse frame adjacent the first wheel and including a crop opening for receiving the outside row of the first pair of rows, and second and third harvesting units mounted on the traverse frame on either side of the second wheel and including crop openings for receiving the second pair of rows, said first harvesting unit being the outermost unit on the first wheel side of the main frame so that side outside of the first wheel is free of and unobstructed in the fore-and-aft direction by a harvesting unit; and means for unloading the harvested cotton toward the first wheel side of the main frame, wherein the means for unloading comprises a basket member transversely extendable toward the first wheel side of the main frame so that the center of gravity of the harvester shifts in the direction opposite the second wheel side of the main frame, the positioning of the harvesting units on the offset head tending to counterbalance the harvester to prevent it from tipping toward the first wheel side.

6. The cotton harvester as set forth in claim 5 wherein the offset head further comprises a fourth harvesting unit mounted on the transverse frame inwardly of the first harvesting unit.

7. The cotton harvester as set forth in claim 6 wherein the harvesting units are uniformly spaced on the transverse frame.

* * * * *

UNITED STATES PATENT AND TRADEMARK OFFICE
CERTIFICATE OF CORRECTION

PATENT NO. : 4,255,919

DATED : March 17, 1981

INVENTOR(S) : R.D. Copley, F.E. Schlueter and M.W. Porter

It is certified that error appears in the above—identified patent and that said Letters Patent is hereby corrected as shown below:

Column 4, line 59, lelete "outside" and insert -- outermost --.

Signed and Sealed this

Sixth Day of April 1982

[SEAL]

Attest:

GERALD J. MOSSINGHOFF

Attesting Officer     Commissioner of Patents and Trademarks